(12) United States Patent
Jensen et al.

(10) Patent No.: US 7,862,793 B2
(45) Date of Patent: Jan. 4, 2011

(54) GROWTH OF AND DEFECT REDUCTION IN NANOSCALE MATERIALS

(75) Inventors: Kenneth J. Jensen, Berkeley, CA (US); William E. Mickelson, San Francisco, CA (US); Alex K. Zettl, Kensington, CA (US)

(73) Assignee: The Regents of the University of California, Oakland, CA (US)

( * ) Notice: Subject to any disclaimer, the term of this patent is extended or adjusted under 35 U.S.C. 154(b) by 683 days.

(21) Appl. No.: 11/278,999

(22) Filed: Apr. 7, 2006

(65) Prior Publication Data

US 2006/0231381 A1 Oct. 19, 2006

Related U.S. Application Data

(60) Provisional application No. 60/669,838, filed on Apr. 8, 2005.

(51) Int. Cl.
*D01F 9/12* (2006.01)
(52) U.S. Cl. .................... 423/447.1; 423/447.2
(58) Field of Classification Search ............ 423/447.3, 423/150, 447.1, 447.2
See application file for complete search history.

(56) References Cited

U.S. PATENT DOCUMENTS

| | | | |
|---|---|---|---|
| 7,655,302 B2 * | 2/2010 | Smalley et al. ............. | 428/367 |
| 2003/0175161 A1 * | 9/2003 | Gabriel et al. ............... | 422/90 |
| 2005/0154199 A1 * | 7/2005 | Whiteford et al. .......... | 540/145 |
| 2005/0253220 A1 * | 11/2005 | Lin et al. .................... | 257/536 |
| 2005/0287717 A1 * | 12/2005 | Heald et al. ................ | 438/128 |
| 2006/0008408 A1 * | 1/2006 | Ho Yoon et al. .......... | 423/447.2 |
| 2006/0067871 A1 * | 3/2006 | Hart et al. ................. | 423/447.3 |
| 2006/0068195 A1 * | 3/2006 | Majumdar et al. .......... | 428/323 |

OTHER PUBLICATIONS

B.C.Regan, Carbon Nanotubes as Nanoscale Mass Conveyors, 2004, Nature, 428, 924.*
Poncharal et al., "Electrostatic Deflections and Electromechanical Resonances of Carbon Nanotubes," Science, vol. 283, pp. 1513-1516, (Mar. 5, 1999).
Bockrath et al., "Luttinger-liquid behaviour in carbon nanotubes," Nature, vol. 397, pp. 598-601, (Feb. 18, 1999).
Hone et al., "Thermal conductivity of single-walled carbon nanotubes," Physical Review B, vol. 59, No. 4, pp. R2514-R2516, (Jan. 15, 1999).
Ebbesen et al., "Large-scale synthesis of carbon nanotubes," Nature, vol. 358, pp. 220-222, (Jul. 16, 1992).
Li et al., "Large-Scale Synthesis of Aligned Carbon Nanotubes," Science, vol. 274, pp. 1701-1703, (Dec. 6, 1996).
Guo et al., "Catalytic growth of single-walled nanotubes by laser vaporization," Chemical Physics Letters, vol. 243, pp. 49-54, (Sep. 8, 1995).
Regan et al., "Carbon nanotubes as nanoscale mass conveyors," Nature, vol. 428, pp. 924-927, (Apr. 29, 2004).
Svensson et al., "Nanopipettes for Metal Transport," Physical Review Letters, vol. 93, No. 14, pp. 145901-1-145901-4, (Oct. 1, 2004).
Satishkumar et al., "Single-walled nanotubes by the pyrolysis of acetylene-organometallic mixtures," Chemical Physical Letters, vol. 293, pp. 47-52, (Aug. 21, 1998).
Ho et al., "Electromigration in metals," Reports on Progress in Physics, vol. 52, pp. 301-348, (Jul. 1989).
Pratt et al., "Electrotransport in metals and alloys," Diffusion and defect monograph series, No. 2, pp. 1-72, 75, 76 & 169, (1973).
Hansen et al., "Constitution of Binary Alloys," Metallurgy and Metallurgical Engineering Series, pp. 349-351, (1958).
Buffat et al., "Size effect on the melting temperature of gold particles," Physical Review A, vol. 13, No. 6, pp. 2287-2298, (Jun. 1976).
Krivoruchko et al., "A new phenomenon involving the formation of liquid mobile metal- carbon particles in the low-temperature catalytic graphitisation of amorphous carbon by metallic Fe, Co and Ni," Mendeleeve Communication, vol. 8, No. 3, pp. 97-99, (1998).
Fujiwara, "Electronic states and transport in amorphous and liquid transistion metals; Fe, CO and Ni," Journal of Physics F-Metal Physics, vol. 9, No. 10, pp. 2011-2024, (1979).

* cited by examiner

*Primary Examiner*—Timothy C Vanoy
*Assistant Examiner*—Michelle Hou
(74) *Attorney, Agent, or Firm*—Lawrence Berkeley National Laboratory; Leonard T. Guzman

(57) ABSTRACT

Methods by which the growth of a nanostructure may be precisely controlled by an electrical current are described here. In one embodiment, an interior nanostructure is grown to a predetermined geometry inside another nanostructure, which serves as a reaction chamber. The growth is effected by a catalytic agent loaded with feedstock for the interior nanostructure. Another embodiment allows a preexisting marginal quality nanostructure to be zone refined into a higher-quality nanostructure by driving a catalytic agent down a controlled length of the nanostructure with an electric current. In both embodiments, the speed of nanostructure formation is adjustable, and the growth may be stopped and restarted at will. The catalytic agent may be doped or undoped to produce semiconductor effects, and the bead may be removed via acid etching.

16 Claims, 4 Drawing Sheets

GROWTH OF AND DEFECT REDUCTION IN NANOSCALE MATERIALS

CROSS REFERENCE TO RELATED APPLICATIONS

This application claims benefit of priority to U.S. provisional patent application 60/669,838, filed Apr. 8, 2005, which is hereby incorporated by reference in its entirety.

STATEMENT REGARDING FEDERAL FUNDING

This invention was made with U.S. Government support under Contract Number DE-AC02-05CH11231 between the U.S. Department of Energy and The Regents of the University of California for the management and operation of the Lawrence Berkeley National Laboratory. The U.S. Government has certain rights in this invention.

REFERENCE TO A COMPUTER PROGRAM

Not Applicable.

BACKGROUND OF THE INVENTION

1. Field of the Invention

The present invention relates generally to nanostructure modification, more specifically to nanostructure refinement for defect reduction and doping, growth of internal nanostructures within external nanostructures, and selective doping of nanostructures for semiconductor functionality.

2. Description of the Relevant Art

Nanostructures, comprising multiwall nanotubes (MWNTs), nanoropes, single wall nanotubes, nanocarpets, nanocrystals, and nanohorns, are well known in the art. What appears to be missing in the art are methods for cleaning such nanostructures. Additionally, it appears that there are no methods for growing nanostructures with a predefined length, diameter, and defect density. It additionally appears that there are no methods of transforming defective nanostructures by zone-refinement into less defective nanostructures.

BRIEF SUMMARY OF THE INVENTION

In one embodiment, this invention provides for a method of nanostructure growth, comprising: a) providing an outer nanostructure having an open interior region; b) providing a catalytic agent disposed within the open interior region; and c) passing an electrical current through the nanostructure sufficient to controllably move the catalytic agent for a desired distance in a desired direction. The method of nanostructure growth may comprise: a) providing a substantial quantity of an interior nanostructure feedstock initially disposed within the catalytic agent; and b) forming a grown interior nanostructure from the interior nanostructure feedstock within the open interior region for a desired length. Restating this, the feedstock material, such as carbon in the catalytic agent, is used to form an interior nanostructure. This may be formed for as long as desired, subject to the availability of the feedstock in the catalytic agent.

The catalytic agent feedstock may have chemical composition different than that of the exterior nanostructure. Thus, when the interior nanostructure is grown, it is of a different chemical composition than the outer nanostructure. It would be then possible to formulate an internal nanostructure different than the external nanostructure.

At this point, it appears that the outer nanostructure must have an interior region in order to grow an interior nanostructure. This would restrict the outer nanostructure to being a single- or multi-walled nanotube, or hollow rope shape. The grown interior nanostructure is one of a group consisting of: a single walled nanotube, a multiwalled nanotube, a nanowire, a nanocrystal, and a nanohorn. The grown interior nanostructure has a diameter fixed by the open interior region of the outer nanostructure.

The grown interior nanostructure may be either electrically conductive, nonconductive, or semiconductor in nature depending on the composition of the catalytic agent. After fabrication of the interior nanostructure, removal of the catalytic agent may be achieved by reacting the catalytic agent with an acid, such as $HNO_3$.

In an alternate embodiment, a method of zone refining a nanostructure, may comprise: a) providing an initial unrefined nanostructure containing an initial amount of defects; b) providing a catalytic agent disposed about the initial unrefined nanostructure; c) zone refining the initial unrefined nanostructure into a reformed nanostructure for a desired length by passing an electrical current through the initial unrefined nanostructure sufficient to controllably move the catalytic agent for a desired distance in a desired direction. The catalytic agent may be disposed in the interior region of a nanotube, on the exterior of a nanostructure, or in one or more locations on the interior or exterior of the nanostructure. Thus, a nanotube may be refined with different properties in one or more stripes as desired.

Through the method of zone refinement, the initial amount of defects in the reformed nanostructure may substantially reduced. Such reduction may preferably be more than 90% atomically perfect, more preferably more than 95% atomically perfect, and still more preferably more than 99% atomically perfect. Ideally, the reformed nanostructure may be completely defect free with a completely regular atomic lattice pattern.

After zone refining a nanostructure the catalytic agent may be removed. Such removal may be accomplished by contacting the catalytic agent, which is typically a metal, with an acid.

In another embodiment, the method of zone refining described above may comprise: a) providing an initial unrefined nanostructure doped with an initial dopant; b) providing a catalytic agent doped with a dopant different than the initial dopant; and c) reforming the initial unrefined nanostructure into a doped nanostructure doped with the catalytic agent dopant. By zone refining in this manner, the resulting doped nanostructure may comprise one of a group consisting of: a Schottky diode, a diode, a heterojunction, and a transistor.

The dopants used would be those appropriate to the composition of the nanostructure desired. For instance, with a carbon nanostructure, B and N would be immediately thought of for doping. Dopants would comprise the same as those used presently for semiconductor processing.

The zone refining of the nanostructure may be done on a chip, such as an integrated circuit chip. The small amount of heat generated by the zone refining process is thought to be safe for other components on the chip. Since the nanostructures are so very small, it is believed that a plurality reaching thousands to millions of them may be zone refined in parallel.

Further, by zone refining a nanostructure, a resonance frequency of the nanostructure may be modified by moving the catalytic agent to a specific location. By simple movement of the catalytic agent, additional functions may be obtained, such as one or more of the group consisting of: i) a magnetic contact, where the catalytic agent is ferromagnetic; ii) a static oscillation resonance mass for tuning; iii) a static rotational torque point, again for tuning; iv) a means for driving the nanostructure, generally under magnetic or electric fields; v) a means for moving the nanostructure; and vi) a means for actuating the nanostructure.

The method of zone refining a nanostructure may use a catalytic agent comprised of essentially cobalt with or without additional nanostructure feedstock.

The refining of the nanostructure into a reformed nanostructure may be accomplished for a desired length, wherein the nanostructure initially contains an initial amount of defects, the initial amount of defects in the reformed nanostructure is substantially reduced. In two embodiments, the initial defects of the nanostructure may be significantly or completely removed. In any event, the resultant reformed nanostructure may be essentially defect free.

After refining and reforming the initial defect-laden nanostructure, the catalytic agent may be removed mechanically, or by chemical etching by suitable acids alone or in combination.

When the catalytic agent contains a substantial quantity of nanostructure feedstock one may form an interior nanostructure within the interior region for a desired length. This could potentially also be accomplished where the catalytic agent contains both feedstock and a dopant.

Movement of the catalytic agent, for all cases, may be controlled by the magnitude and direction of the current. An interior nanostructure may be created within the interior region for a desired length, in either direction from the catalytic agent. This is even when the initial nanostructure initially does not have the smaller nanostructure within the interior region. For the new interior nanostructure to be formed there must be sufficient feedstock in the catalytic agent to make it.

The method of nanostructure modification may comprise: a) refining the nanostructure into a reformed nanostructure for a desired length, wherein the nanostructure initially contains a substantial amount of a dopant. This method results in controlled doping for a controlled period of length in a nanostructure.

BRIEF DESCRIPTION OF THE SEVERAL
VIEWS OF THE DRAWINGS

The invention will be more fully understood by reference to the following drawings, which are for illustrative purposes:

Figure 2:
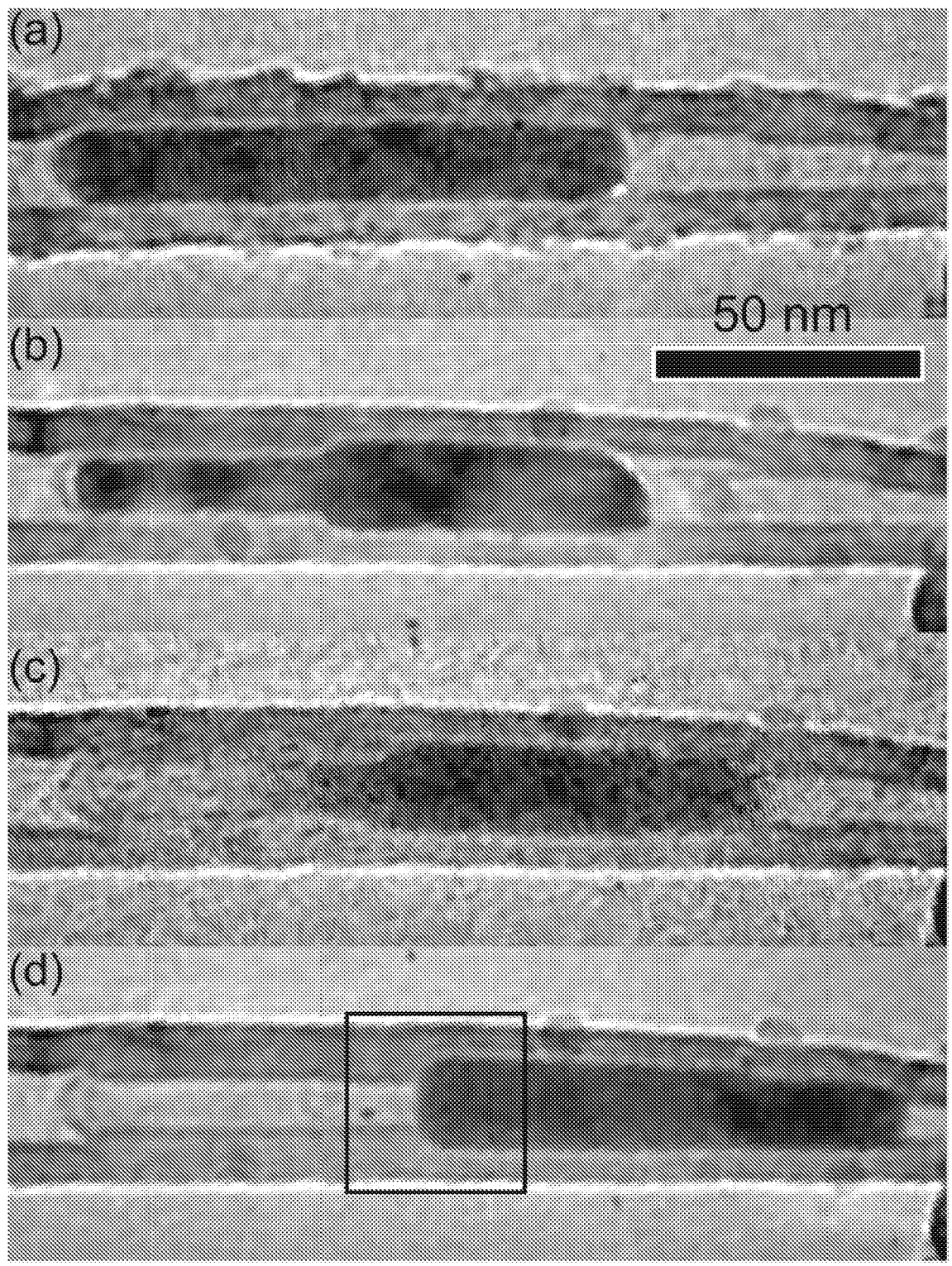

FIG. 2 frames (a) through (d) shows a time sequence of TEM video images showing the controlled movement of a cobalt catalyst particle.

Figure 3:
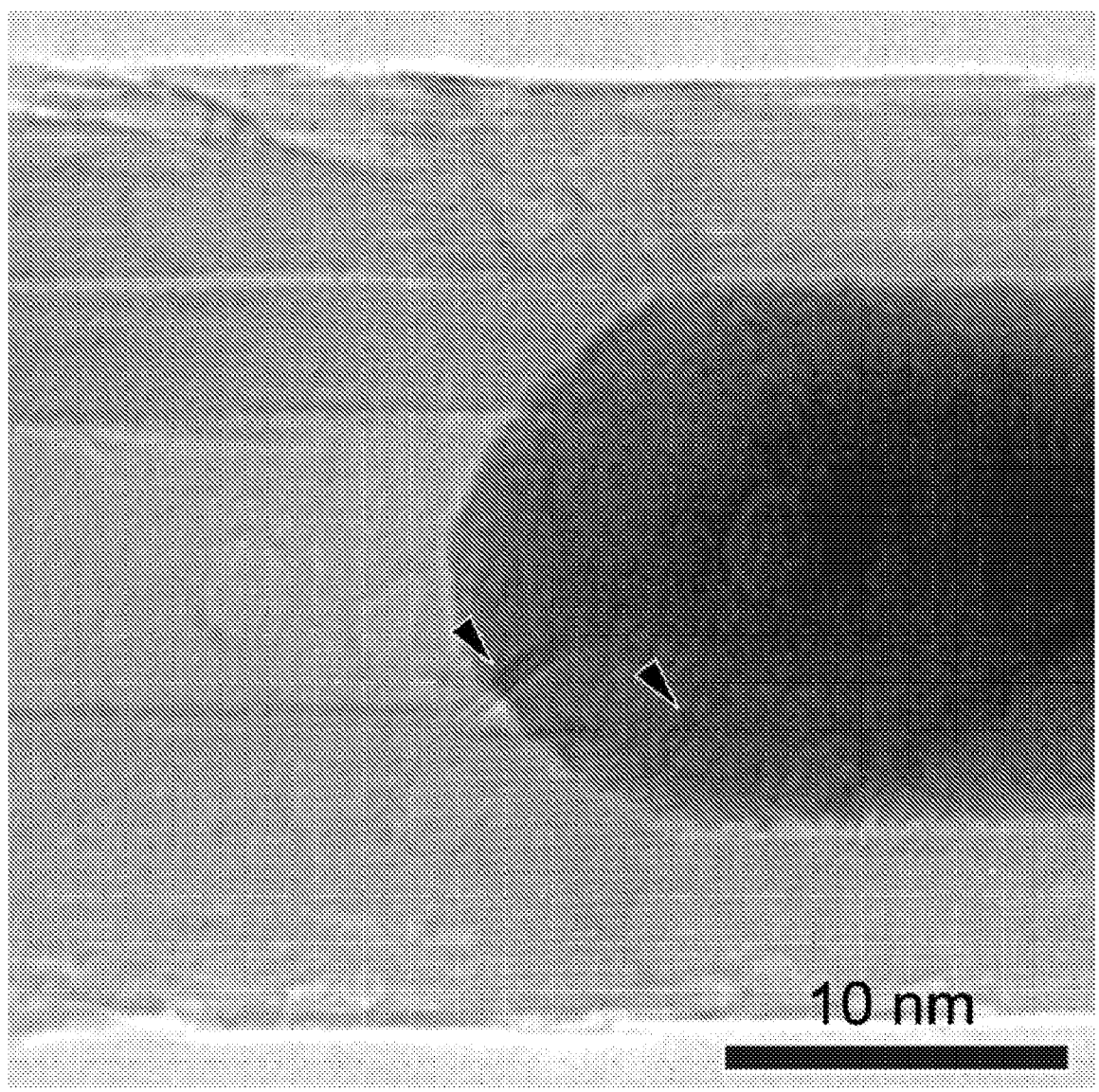

FIG. 3 shows a TEM micrograph of a high-quality multiwall CNT growing within the core of a larger nanotube reaction chamber. This is the area outlined in FIG. 2(d). The image clearly shows the formation of a new, high-quality 11-wall CNT streaming from the end of the catalyst particle. Arrows mark multiple double graphene sheets emerging from the catalyst.

Figure 4:
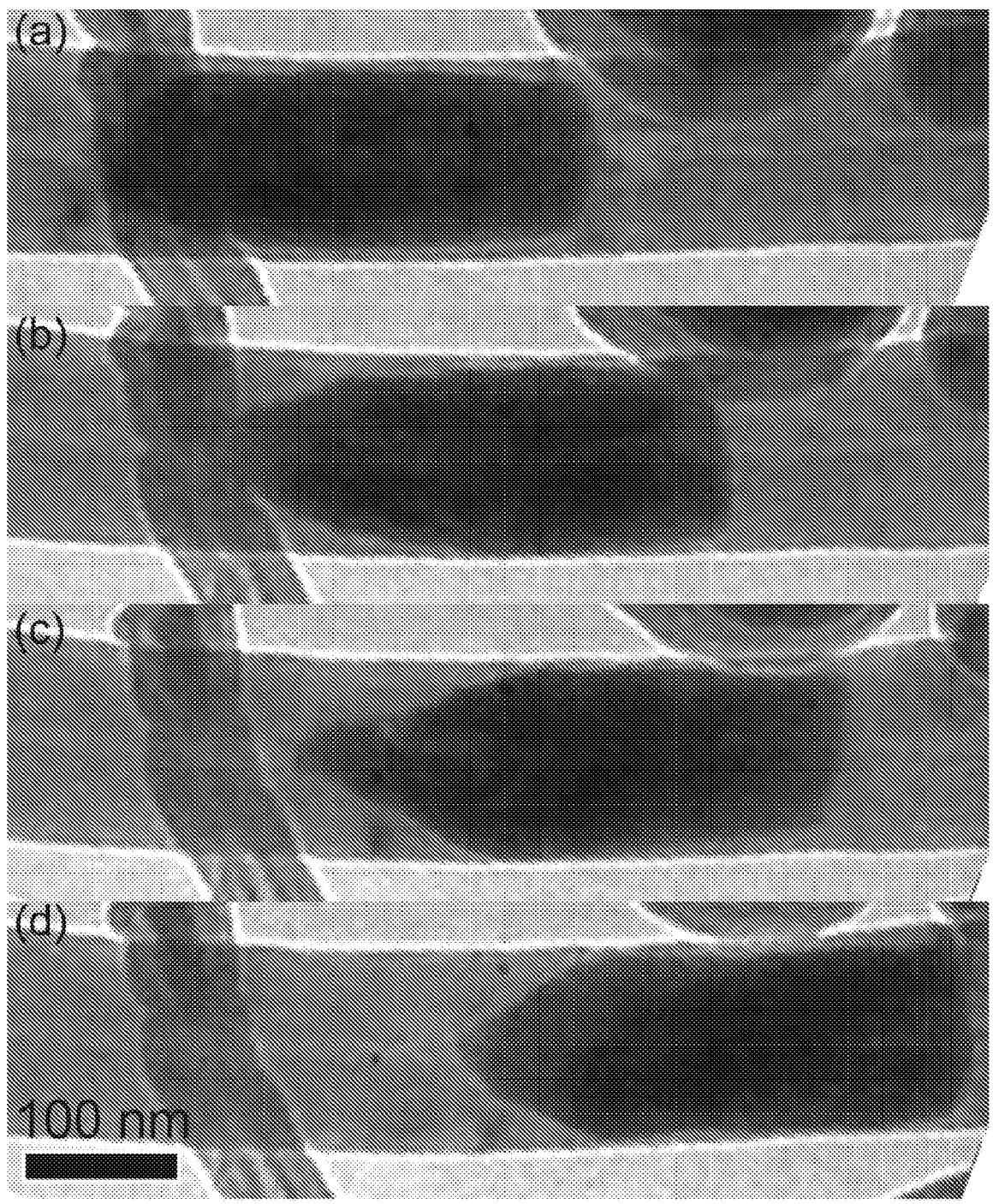

FIG. 4 frames (a) through (d) shows a time sequence of TEM video images showing a cobalt catalyst particle cannibalize a raw nanotube to its right and reform a CNT to its left as it moves toward the anode.

DETAILED DESCRIPTION OF THE PREFERRED
EMBODIMENT

Definitions

Nanostructure means elements comprising: a single or multiwalled nanotube, nanowire, nanoropes comprising a plurality of nanowires, nanocrystals, nanohorns, nanocarpets; and constructs comprised of the foregoing elements.

Catalytic agent means a material that functions as described in this application to provide zone refinement of a nanostructure, or controlled growth of a smaller nanostructure within a larger nanostructure.

NEMS means nano-electro-mechanical systems, a MEMS structure formed in a nanometer scale.

Feedstock means material that is used as a raw material for the growth of a new nanostructure.

INTRODUCTION

In this application methods for inserting catalytic agents (comprising metal catalyst particles) within nanostructures are disclosed. Methods for controlling the temperature, speed, and direction of movement of the catalytic agent within a pre-formed nanostructure are shown.

Nanostructures can be grown with a predefined length, radius, and defect density. Defective nanostructures may be zone-refine into pure (or relatively defect-free) nanostructures. Doped nanostructures may be selectively doped by catalytic agent dopant for selected lengths, thus forming diodes or other electronic components. Both the growth and the zone-refinement of the nanostructures are compatible with high resolution transmission electron microscopy enabling the coincident study of nanostructure growth mechanisms with atomic resolution.

It is believed that, prior to this invention there was no way to precisely control the length, radius, or defect density of an individual nanostructure during synthesis. Obtaining nanostructures with tailored properties generally required imprecise, low-yield filtering and purification techniques. Previously, refining a nanostructure or reducing its defect density required annealing the nanostructure at high temperatures of 500° C. or higher. Before this invention, it was impossible to observe the growth of nanostructures with atomic resolution.

SUMMARY OF INVENTION

Methods of precisely controlling the temperature, speed, and direction of catalytic agents within nanostructures have been developed. This enables the synthesis of nanostructures with tailored properties or the zone-refinement of preexisting nanostructures. The methods described here comprise: a) inserting or forming a catalytic agent into an interior region of a nanostructure, b) creating an electrical circuit across the nanostructure, and c) injecting an electrical current into the system to simultaneously heat and direct the movement of the catalytic agent. The method can be used to produce virtually defect-free nanostructures with superior mechanical and electrical properties.

Dopants may be added by zone refining with a doped catalytic agent. Dopants may be removed from a doped nanostructure by zone refining of the dope nanostructure. Sections of semiconductor elements may be created by zone refinement of a p-type doped nanostructure with an n-type doped catalytic agent, or vice versa.

EMBODIMENTS OF THE INVENTION

Nanostructure devices processed by the methods of this invention allow a myriad of uses, including, but not limited to:

1) creating tailored nanostructures for NEMS devices;
2) precisely controlled thermal conductivity of nanostructures used as heat pipes in integrated circuits;
3) precisely controlled electrical conductivity of nanostructures used as wires, resistors, or other lumped circuit elements in integrated circuits;
4) controlling the resonance frequency of a high-Q nanostructure oscillator by changing the position of a catalyst particle weight or altering the structure of the nanostructure;
5) zone-refinement of nanostructure samples;
6) creating ultimate-strength mechanical reinforcements, for buildings, aviation and aerospace vehicles, transportation, sporting goods, etc.; and
7) observation and study of nanostructure growth mechanisms with atomic resolution.

Carbon nanotubes (CNTs) are remarkable materials with interesting mechanical, electrical, and thermal properties[1-3]. These properties are sensitive to geometrical details, which depend intricately on the method of nanotube growth. As such, much effort has been devoted to studying CNT synthesis and growth mechanisms. Numerous methods presently exist for CNT production[4-6]. Unfortunately, none of these bulk synthesis methods affords truly controlled growth, whereby a CNT can be grown at a precisely determined rate with pre-selected diameter, length, and defect concentration. Presented here are two novel reaction methods by which the growth of a single CNT can be precisely controlled using an electrical current. In the first method, a CNT grows inside a preformed nanotube reaction chamber, thus forming a multiwalled carbon nanotube of precise outer diameter. In the second closely related method, a preexisting marginal quality multiwall CNT is zone refined into a higher-quality multiwall CNT.

One experimental configuration exploits the well-known critical role transition metal catalysts play in CNT growth as well as the ability to transport metals along[7,8] preformed nanotubes. Multiwall CNTs containing cobalt catalyst nanoparticles in their interior were synthesized through the pyrolysis of cobaltocene[9]. A mat of cobalt-filled nanotubes was then glued to a platinum wire with conducting silver epoxy and mounted to a custom-made piezo-controlled nanomanipulation stage, operated inside a transmission electron microscope (TEM). Inside the TEM, the free end of a single nanotube was approached and contacted with an etched tungsten tip, thus completing a circuit between the grounded tungsten tip and the sample that can be held at an arbitrary voltage.

Figure 1:
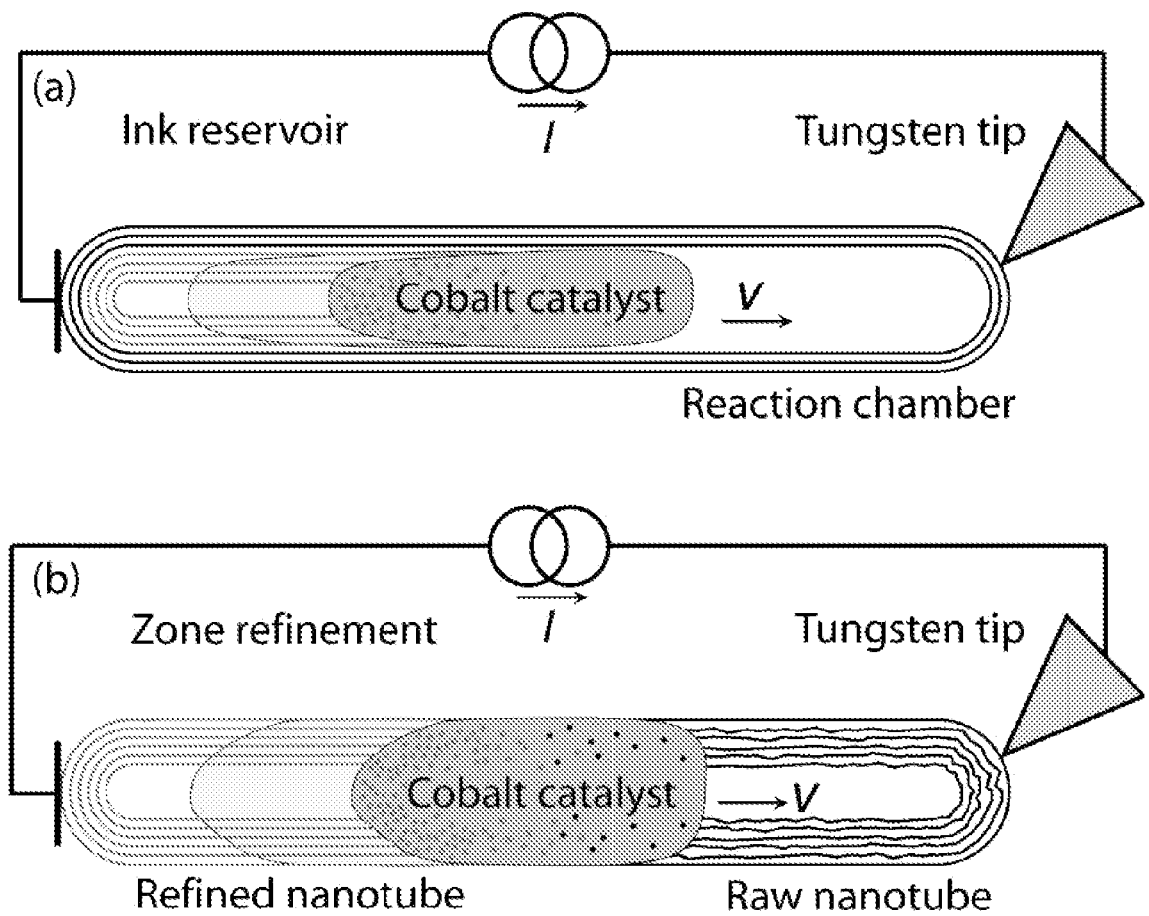
FIG. 1A is a schematic diagram of the ink reservoir modes of operation, indicating that as the catalyst moves, carbon initially dissolved in the catalyst particle (the "ink") precipitates out and forms a new high-quality carbon nanotube (CNT).
FIG. 1B is a schematic diagram of the zone refinement method, where the catalyst particle continuously refines a raw, defective nanotube on the right into a higher-quality nanotube on the left.

FIG. 1 depicts a schematic of an experimental setup and distinguishes the two modes of operation. FIG. 1A shows what termed the "ink reservoir" method of nanotube growth. A cobalt catalyst nanoparticle, initially containing dissolved carbon (the "ink"), is confined within an interior region of a preformed nanotube, which serves as the reaction chamber. An electrical current I passes through the reaction chamber nanotube, causing the catalyst particle to melt and move to the right at velocity v, streaming out a newly formed CNT in its wake within the interior region. The outer diameter of the new CNT is dictated by the inner diameter of the reaction chamber, and the speed at which the catalyst particle ejects the new CNT is controlled by I. CNT growth ceases when the cobalt catalyst particle exhausts its feedstock of dissolved carbon.

FIG. 1B shows the "zone refinement" configuration. A preformed nanotube of marginal quality contains a cobalt catalyst nanoparticle, which encompasses its entire cross-section. An electrical current I again passes axially through the nanotube, causing the cobalt nanoparticle to melt and move to the right. In doing so, the original nanotube is consumed by the catalyst nanoparticle and a higher quality CNT is grown and ejected from the trailing end. In this continuous process there is no carbon feedstock limitation and the entire original nanotube can be zone refined into a higher quality CNT.

The ink reservoir method of controlled CNT growth depicted in FIG. 1A is first examined. FIGS. 2(a)-2(d) show a time sequence of TEM video images depicting the movement of a cobalt catalyst particle through the core of the nanotube reaction chamber. The grounded tungsten tip contacts the right side of the nanotube while the sample side is held at a negative potential (both out of view). With increasing current I, Joule heating melts the catalyst particle (the dark cigar-shaped object), and electric field effects generate a force that displaces it towards the anode on the right. In FIG. 2(b) the current is ramped to 60 µA, and the catalyst particle distorts in shape and begins moving to the right. Further increasing the current I increases the velocity v of the catalyst particle. Between FIGS. 2(c) and 2(d), both with I=130 µA, the catalyst travels 68 nm in less than 0.1 s. As the catalyst particle moves to the right within the nanotube reaction chamber, it ejects behind it a new multiwall CNT.

In either of the cases shown in FIGS. 1A and 1B, the catalyst particle may be doped with one or more dopants such that the resulting grown or modified multiwalled carbon nanotube has semiconductor characteristics. By combining the operations of zone refinement and growing new multiwalled carbon nanotubes within the interior region of an existing structure, nanoelectronic structures may be created.

FIG. 3 shows a high-resolution TEM micrograph enlargement of the outlined area in FIG. 2(d) taken after the catalyst particle was frozen in place. In contrast to the reaction chamber nanotube, which has curved, defect-filled walls, the newly formed CNT ejected from the catalyst particle has virtually perfect walls with no detectible defects, even near the interface with the reaction chamber. Essentially a snapshot of catalytic CNT growth, this FIG. 3 contains a wealth of information pertinent to nanotube formation. In particular, the FIG. 3 shows multiple double graphene sheets emerging from the catalyst particle at an angle to the walls of the newly formed CNT. Interpreting the double graphene sheets (as indicated by arrow heads in FIG. 3) as portions of nanotube shells, it is found that, in this growth process, CNT walls are laid down or "paved" on top of each other from the outside in, rather than simply being ejected from the catalytic particle simultaneously. Atomic resolution videos capturing the synthesis of multiwall CNTs in action have obvious implications for the thermodynamic analysis of nanotube synthesis.

In the ink reservoir method of CNT formation, growth ceases when the catalyst particle depletes its feedstock of dissolved carbon. For the new CNT shown in FIG. 2, growth was limited to about 70 nm. The volume of the catalyst particle decreases as it expels the new CNT (by 760 nm$^3$ from the initial volume of 1.6×10$^4$ nm$^3$). Attributing the entire volume loss to carbon, it is estimated that the catalyst particle initially contained approximately 5.9 atomic percent carbon.

The zone refinement method of controlled CNT growth described in FIG. 1B is next examined. FIG. 4 shows a time sequence of TEM video images taken at 10 s intervals depicting a catalyst particle refining a multiwall carbon nanotube. A constant current of 240 μA runs though the nanotube. The catalyst particle encompasses practically the entire diameter of the nanotube, and as it advances towards the anode (out of view to the right), it cannibalizes raw nanotube at its front. A light band running through the center of the particle indicates a radial carbon concentration gradient in the particle resulting from the fact that no carbon is absorbed from the hollow nanotube core. The absorbed carbon is reformed into a new, higher-quality CNT at its rear. Over the course of the experiment, the resistance of the entire nanotube (raw and reformed) is found to decrease by 6% following the advance of the catalyst along the full 3 μm length of the nanotube. Hence, the refined nanotube has an enhanced electrical conductance, which is consistent with a decreased defect concentration. In contrast to the ink reservoir method, in the zone refining method a constant supply of carbon ingested at the head of the catalyst particle allows for essentially unlimited dissolution and precipitation of CNTs.

The carbon supply's effect on transport suggests that the electromigration of carbon in cobalt drives the motion. Previous experiments have shown that carbon ions move toward the cathode in cobalt[10]. Here the direct electrostatic force on the carbon ions dominates over the "electron wind" force resulting from the momentum transfer between electrons and ions[11]. As a result a carbon concentration gradient develops across the catalyst particle. Eventually, the side of the particle near the cathode becomes supersaturated with carbon causing the carbon to precipitate. The maximum carbon concentration, $n_{max}$ may be calculated from the 12.75 atomic percent carbon that cobalt in its liquid state near the melting point can accommodate[12]. When the carbon precipitates, it forms new concentric nanotube shells that displace the cobalt as demonstrated in FIG. 2B. To minimize surface energy, molten cobalt will minimize contact surface area with the nanotube. Thus, as shown in FIGS. 2C and 2D, surface tension forces the catalyst particle out of the region narrowed by new CNT formation, and the catalyst particle moves forward.

To test the model, the current density necessary to initiate movement was estimated by calculating the electric field required to increase the carbon concentration to $n_{max}$ on the side of the particle near the cathode. The carbon concentration across the cobalt particle in the steady state is given by combining the Nernst-Einstein equation with the diffusion equation to yield: $n(x)=n(0)e^{-Z^0|E|x/kT}$ where x is a linear position, n is the ion concentration, $Z^0$ is the effective valence of the ion, e is the charge of an electron, $\vec{E}$ is the electric field, k is the Boltzmann constant, and T is the temperature[11]. According to this model, carbon will precipitate and the particle will move when $n(x)=n_{max}$. For the particle displayed in FIG. 2(a), assuming the precipitation of all the initial carbon is responsible for the noted volume change, it is found that the mean ion concentration, $\bar{n} \approx 5$ ions/nm$^3$. Thus, with $Z^0=10^{11}$, $n_{max}=10$ ions/nm$^3$, and T=1000 K[13,14], it is determined that $|E| \approx 1.3 \times 10^{-4}$ V/nm. Assuming all current passes through the cobalt catalyst particle and using the resistivity of pure molten cobalt ($\rho_{Co}=8.7 \times 10^{-7}$ Ω·m)[15], one may calculate that I~20 μA, the same magnitude as experimentally observed values.

These techniques offer the unique opportunity both to study nanotube growth with atomic resolution in a controllable manner and to fine-tune the parameters of nanotube formation.

Using the refinement process, a carbon-loaded catalyst particle is either incorporated into each original MWNT via the original synthesis process or inserted later. An electrical current is passed through the tubes, driving the melted catalyst beads down the tube. The catalyst bead consumes and re-forms the original low-grade nanotube as it migrates, ejecting a higher quality MWNT from the trailing end. Because the carbon particles in the catalyst are replenished, defect-free nanotubes as long as the original tube can be generated. It appears from the electron micrographs that nanotubes may be created approaching an atomic-level defect free state. The electrical current determines the speed of the nanotube formation or refinement, which in turn allows control of the tube's defect concentration, and therefore, its electrical, thermal, and mechanical properties. The catalysts can be left on the nanotube or removed through acid etching.

REFERENCES

[1] P. Poncharal, Z. L. Wang, D. Ugarte, and W. A. de Heer, *Electrostatic deflections and electromechanical resonances of carbon nanotubes*. Science 283, 1513 (1999).

[2] M. Bockrath, D. H. Cobden, J. Lu, A. G. Rinzler, R. E. Smalley, T. Balents, and P. L. McEuen, *Luttinger-liquid behaviour in carbon nanotubes*. Nature 397, 598 (1999).

[3] J. Hone, M. Whitney, C. Piskoti, and A. Zettl, *Thermal conductivity of single-walled carbon nanotubes*. Physical Review B 59(4):P. R2514-r2516 (1999).

[4] T. W. Ebbesen and P. M. Ajayan, *Large-Scale Synthesis of Carbon Nanotubes*. Nature 358, 220 (1992).

[5] W. Z. Li, S. S. Xie, L. X. Qian, B. H. Chang, B. S. Zou, W. Y. Zhou, R. A. Zhao, and G. Wang, *Large-Scale Synthesis of Aligned Carbon Nanotubes*. Science 274, 1701 (1996).

[6] T. Guo, P. Nikolaev, A. Thess, D. T. Colbert, and R. E. Smalley, *Catalytic Growth of Single-Walled Nanotubes By Laser Vaporization*. Chemical Physics Letters 243, 49 (1995).

[7] B. C. Regan, S. Aloni, R. O. Ritchie, U. Dahmen, and A. Zettl, *Carbon nanotubes as nanoscale mass conveyors*. Nature 428, 924 (2004). K. Svensson, H. Olin, and E. Olsson, Physical Review Letters 93, 145901 (2004).

[8] K. Svennson, H. Olin, and E. Olsson, *Nanopipettes for Metal Transport*. Physical Review Letters, 2004. 93(14): p. 145901-4.

[9] B. C. Satishkumar, A. Govindaraj, R. Sen, and C. N. R. Rao, *Single-walled nanotubes by the pyrolysis of acetylene-organometallic mixtures*. Chemical Physics Letters 293, 47 (1998).

[10] P. S. Ho and T. Kwok, *Electromigration in metals*. Reports on Progress in Physics 52, 301 (1989).

[11] J. N. Pratt and R. G. R. Sellors, *Electrotransport in metals and alloys*, Diffusion and defect monograph series; no. 2 (Trans Tech SA, Riehen, 1973).

[12] M. Hansen, R. P. Elliott, F. A. Shunk, and I. R. Institute., *Constitution of binary alloys*. Metallurgy and metallurgical engineering series (McGraw-Hill, New York 1958), 2nd ed., prepared with the cooperation of Kurt Anderko, illus. 24 cm. Translation and revision of Der Aufbau der Zweistoffiegierungen.

[13] P. Buffat and J. P. Borel, *Size Effectg on Melting Temperature of Gold Particles*. Physical Review A 13, 2287 (1976).

[14] O. P. Krivoruchko and V. I. Zaikovskii, *A new phenomenon involving the formation of liquid mobile metal-carbon particles in the low-temperature catalytic graphitisation of amorphous carbon my metallic Fe, Co, and Ni*. Mendeleev Communication. 1998(3): p. 97-100.

[15] T. Fujiwara, *Electronic States and Transport in Amorphous and Liquid Transition-Metals—Fe, Co and Ni*. Journal of Physics F-Metal Physics, 1979. 9(10): p. 2011-2024.

CONCLUSION

All publications, patents, and patent applications mentioned in this specification are herein incorporated by reference to the same extent as if each individual publication or patent application were each specifically and individually indicated to be incorporated by reference.

The description given here, and best modes of operation of the invention, are not intended to limit the scope of the invention. Many modifications, alternative constructions, and equivalents may be employed without departing from the scope and spirit of the invention.

It is claimed:

1. A method of nanostructure growth, comprising:
   a) providing an outer nanostructure having an open interior region;
   b) providing a catalytic agent disposed within the open interior region;
   c) providing a substantial quantity of an interior nanostructure feedstock initially disposed within the catalytic agent;
   d) passing an electrical current through the outer nanostructure sufficient to controllably move the catalytic agent for a desired distance in a desired direction; and
   e) growing an interior nanostructure from the interior nanostructure feedstock within the open interior region for a desired length as the catalytic agent moves for at least a portion of the desired distance.

2. The method of nanostructure growth of claim 1, wherein: the interior nanostructure is one of a group consisting of: a single walled nanotube, a multiwalled nanotube, a nanowire, and a nanohorn.

3. The method of nanostructure growth of claim 1, wherein: the interior nanostructure has a diameter fixed by the open interior region of the outer nanostructure.

4. The method of nanostructure growth of claim 1, comprising: reacting the catalytic agent with an acid to remove the catalytic agent.

5. The method of nanostructure growth of claim 4, wherein the catalytic agent comprises cobalt.

6. The method of nanostructure growth of claim 4, wherein the interior nanostructure is one of a group consisting of: a single walled nanotube, a multiwalled nanotube, a nanowire, and a nanohorn.

7. The method of nanostructure growth of claim 4, wherein the interior nanostructure has a diameter fixed by the open interior region of the outer nanostructure.

8. The method of nanostructure growth of claim 4, wherein the interior nanostructure is a different chemical composition than the outer nanostructure.

9. The method of nanostructure growth of claim 4, wherein the interior nanostructure is nonconductive.

10. The method of nanostructure growth of claim 1, wherein the catalytic agent comprises cobalt.

11. The method of nanostructure growth of claim 1, wherein the interior nanostructure is a different chemical composition than the outer nanostructure.

12. The method of nanostructure growth of claim 1, wherein the interior nanostructure is nonconductive.

13. A product comprising:
    a) an outer nanotube having an outer length; and
    b) an interior nanotube within the outer nanotube, the interior nanotube having a desired length that is less than the overall length.

14. The product of claim 13, further comprising a catalytic agent disposed within the outer nanotube and at an end of the interior nanotube.

15. The product of claim 14, wherein the catalytic agent comprises cobalt.

16. The product of claim 13, wherein the interior nanotube is one of the group consisting of: a single walled nanotube, a multiwalled nanotube, a nanowire, and a nanohorn.

* * * * *